United States Patent [19]

Coates

[11] Patent Number: 6,065,109
[45] Date of Patent: *May 16, 2000

[54] ARBITRATION LOGIC USING A FOUR-PHASE SIGNALING PROTOCOL FOR CONTROL OF A COUNTERFLOW PIPELINE PROCESSOR

[75] Inventor: William S. Coates, Redwood City, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/795,440

[22] Filed: Feb. 5, 1997

[51] Int. Cl.[7] .............................. G06F 12/08; G06F 7/00
[52] U.S. Cl. .............................. 712/201; 712/25; 712/33
[58] Field of Search .................................. 395/376, 377, 395/800.33, 800.25; 712/200, 201, 33, 25

[56] References Cited

U.S. PATENT DOCUMENTS

| | | | |
|---|---|---|---|
| 5,544,342 | 8/1996 | Dean | 711/119 |
| 5,572,690 | 11/1996 | Molnar | 395/376 |
| 5,752,070 | 5/1998 | Martin et al. | 395/800.33 |

OTHER PUBLICATIONS

Sproull eta l. (Counter flow pipeline processor architecture) Sun Microsystems LAb, Inc. p. 1–23, Apr. 1994.

*Primary Examiner*—William M. Treat
*Assistant Examiner*—Gautam R. Patel
*Attorney, Agent, or Firm*—Townsend and Townsend and Crew LLP

[57] ABSTRACT

A counterflow pipeline is provided which includes an instruction pipeline having a plurality of stages for transmitting instruction packets in a first direction and a result pipeline having a plurality of stages for transmitting result packets in a second direction opposite the first direction. Each of the result pipeline stages corresponds to an instruction pipeline stage, the associated instruction and result pipeline stages being part of a counterflow pipeline stage. Arbitration logic coupled between the instruction and result pipelines facilitates the movement of instruction and result packets in the stages of the instruction pipeline and result pipeline, respectively, using a four-phase level signaling protocol. The arbitration logic prevents instruction and result packets from passing each other in their respective pipelines by inhibiting them from being simultaneously released from adjacent counterflow pipeline stages. Thus, any necessary interaction between the two data packets may take place.

18 Claims, 14 Drawing Sheets

ARBITRATION LOGIC USING A FOUR-PHASE SIGNALING PROTOCOL FOR CONTROL OF A COUNTERFLOW PIPELINE PROCESSOR

BACKGROUND OF THE INVENTION

The present invention relates to pipeline design for use in an asynchronous microprocessor. More specifically, the invention relates to a counterflow pipeline, i.e., a pipeline having oppositely flowing and interconnected instruction and result pipelines between which instruction and result data may be compared and exchanged.

The basic concept of a counterflow pipeline is introduced in commonly assigned, U.S. Pat. No. 5,572,690, the entire specification of which is incorporated herein by reference. According to that application, a two-phase or transition signaling protocol is used to facilitate movement of instruction and result packets in their respective pipelines.

In the design of an asynchronous circuit, the lack of a global clock necessitates the use of a communication protocol by which requests may be transmitted to the various circuit modules to begin execution of their functions and by which the circuit modules may acknowledge completion of their functions. Typically, two types of communication protocols are employed in asynchronous circuit design. The first is known as two-phase or transition signaling and involves the use of logic signal transitions (in either direction) to indicate the occurrence of an event such as a request or an acknowledge. The protocol is known as two-phase because the interaction between circuit modules is characterized by one of two states, i.e., either a request is outstanding or it is not. This design paradigm is advantageous in that it is aligned with the typical system designer's model of asynchronous system behavior in that transitions map well onto the discrete events which characterize asynchronous system behavior. For this reason, systems employing two-phase signaling tend to be easier to conceptualize and model than functionally similar systems using four-phase signaling.

Unfortunately, according to the two-phase protocol, to determine whether parity exists between a request line and an acknowledge line specialized logic gates such as Muller C elements and exclusive-OR gates are required. Such specialized gates are slower and more complex than "standard" AND and OR gates thus introducing undesirable delays and circuit overhead. Moreover, two-phase signaling often requires additional circuitry to represent the larger number of control states typically required with two-phase signaling.

By contrast, four-phase or level signaling employs specific levels on, for example, a request line and an acknowledge line to control circuit behavior. For example, if a first circuit module transmits data to a second circuit module, the first circuit module first transmits a request to the second circuit module by setting its request line high. When the second circuit module has latched the data its acknowledge line will go high, thereby notifying the first circuit module that the data has been successfully transferred. The request is then reset, thereby permitting the resetting of the acknowledge line soon thereafter. This protocol is referred to as four-phase because of the four different possible states of the request and acknowledge lines.

Although a complete cycle in the four-phase protocol requires four signal transitions rather than the two required by the two-phase protocol, the apparent inefficiency is mitigated because the state of the request and acknowledge lines can be detected using standard AND and OR gate implementations. Furthermore, the circuit redundancies which are often necessary for a two-phase protocol to provide distinct logic levels to operate data latches are eliminated. Thus, the apparent inefficiency of a four-phase protocol is counterbalanced by the efficiencies of a faster, simpler control circuit design.

SUMMARY OF THE INVENTION

To take advantage of the speed and chip overhead efficiencies discussed above, the present invention employs a four-phase level signaling protocol to implement a counterflow pipeline. Performance modeling of the design described herein has confirmed that use of the four-phase protocol results in faster and simpler counterflow pipeline circuits than the two-phase implementation described in the above-referenced patent application. The various embodiments of the present invention may be used to implement a microprocessor such as the one described in commonly assigned, copending U.S. patent application Ser. No. 08/477, 533 now U.S. Pat. No. 5,600,848 filed on Jun. 7, 1995, which is a continuation of application Ser. No. 08/140,655 now abandoned filed on Oct. 21, 1993, the entire specification of which is incorporated herein by reference.

Thus, according to the present invention, a counterflow pipeline processor is provided which includes an instruction pipeline having a plurality of stages for transmitting instruction packets in a first direction and a result pipeline having a plurality of stages for transmitting result packets in a second direction opposite the first direction. Each of the result pipeline stages corresponds to an instruction pipeline stage, the associated instruction and result pipeline stages being part of a counterflow pipeline stage. Arbitration logic coupled between the instruction and result pipelines controls the movement of instruction and result packets between the stages of the counterflow pipeline using a four-phase level signaling protocol. The arbitration logic prevents instruction and result packets passing each other in their respective pipelines by inhibiting them from being simultaneously released from adjacent counterflow pipeline stages. Thus, any necessary interaction between the two data packets must take place in some counterflow pipeline stage.

The counterflow pipeline processor of the present invention also includes a plurality of full/empty boxes (FEBs) coupled between the instruction and result pipeline stages which constitute a counterflow pipeline stage. Each FEB is associated with a particular counterflow pipeline stage, and determines whether an instruction packet and a result packet are simultaneously latched in its corresponding counterflow pipeline stage, in which case the FEB prevents either from leaving the counterflow pipeline stage until any necessary interaction between the two packets takes place. Such interaction includes garnering and "renraging" operations. A garnering operation is the transfer of result packet data from the result pipeline to replace corresponding instruction packet data in the instruction pipeline. A "renraging" operation is similar to a garnering operation with the roles of instruction and result reversed.

According to a specific embodiment, the arbitration logic includes a plurality of mutual exclusion circuits coupled between the instruction and result pipelines. Each mutual exclusion circuit receives a request signal from a first instruction pipeline stage indicating that an instruction packet is attempting to proceed to the following or second instruction pipeline stage. In response, the mutual exclusion circuit transmits an acknowledge signal to the second instruction pipeline stage giving the instruction packet "permission" to proceed.

The mutual exclusion circuit also receives a request signal from a result pipeline stage corresponding to the second instruction pipeline stage, i.e., forming a counterflow pipeline stage therewith, indicating that a result packet is attempting to proceed to a first result pipeline stage which, with the first instruction pipeline stage, forms the adjacent counterflow pipeline stage. In response, the mutual exclusion circuit transmits an acknowledge signal to the first result pipeline stage giving the result packet "permission" to proceed. The operation of the mutual exclusion circuits is such that the two acknowledge signals are asserted in the proper sequence. As mentioned above, this ensures that instruction packets and result packets do not pass each other in their respective pipelines without an opportunity for any necessary interaction. The arbitration logic uses the signals from the FEBs to gate the acknowledge signals to the control logic which controls the appropriate instruction and result pipeline latches.

A further understanding of the nature and advantages of the present invention may be realized by reference to the remaining portions of the specification and the drawings.

DESCRIPTION OF SPECIFIC EMBODIMENTS

I. The Basic Architecture

Figure 1:
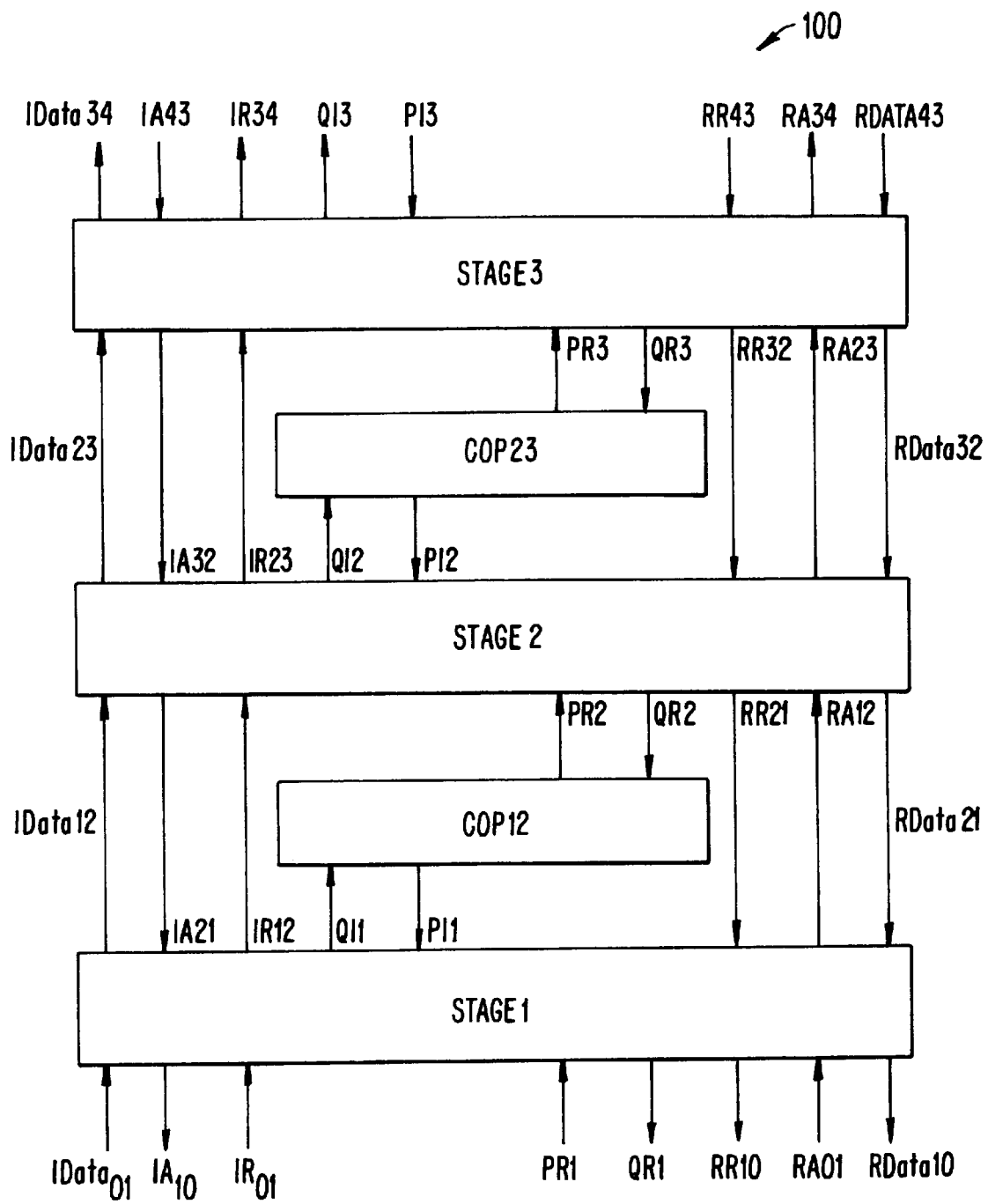
FIG. 1 is a simplified block diagram illustrating the interaction between three stages of a counterflow pipeline designed according to a specific embodiment of the invention.

FIG. 1 is a simplified block diagram showing a portion of a counterflow pipeline 100 designed according to a specific embodiment of the invention. The basic interaction between two adjacent counterflow pipeline stages, i.e., stages 2 and 3, will be discussed with reference to this figure. The signal pairs IA32/IR23 and RA23/RR32 each employ a four-phase handshake protocol to facilitate data movement between stages 2 and 3 in the instruction and result pipelines, respectively. COP23 mediates data flow in the two counterflowing pipelines such that each upwardly flowing instruction packet is guaranteed to meet each downwardly flowing result packet, i.e, COP23 prevents simultaneous movement of an instruction packet from stage 2 to stage 3 and a result packet from stage 3 to stage 2 so that they cannot pass each other in their respective pipelines without having an opportunity to perform any necessary interaction in either stage 2 or stage 3. Each of the "done" signals, i.e., QI2 and QR3, transmitted to the COP independently gates one of the grant outputs, i.e., PI2 and PR3, from the COP. COP23 is implemented as a simple mutual exclusion element which prohibits PI2 and PR3 from being simultaneously high. As will be shown, COP23 also includes two AND gates to provide the "done" signal gating.

Figure 2:
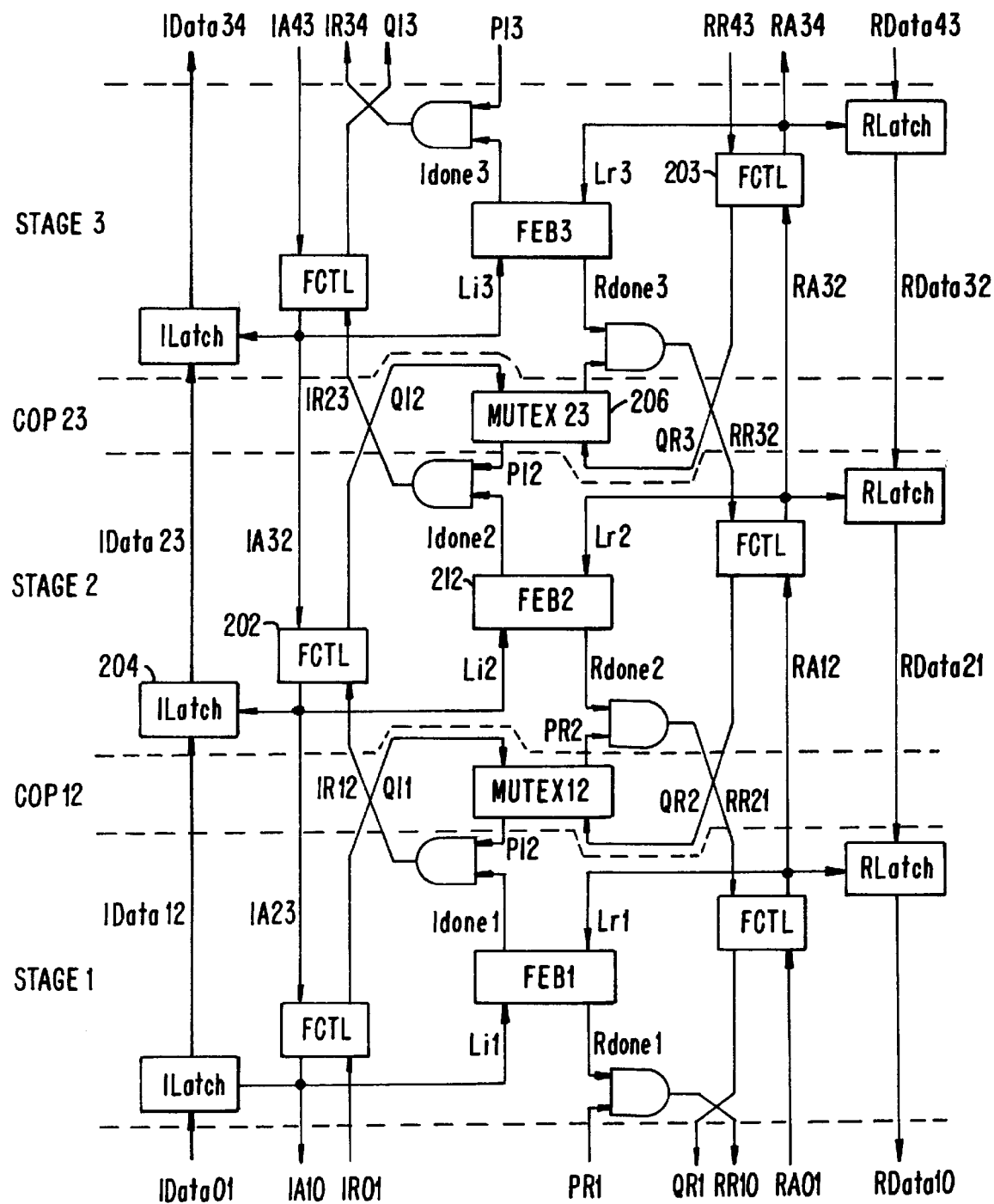
FIG. 2 is a simplified block diagram of a portion of a counterflow pipeline designed according to a specific embodiment of the invention.

FIG. 2 is a more detailed block diagram of counterflow pipeline 100 according to a specific embodiment of the invention. The arbitration and data movement mechanisms of pipeline 100 and the operation of the FIFO control (FCTL) circuits are more clearly understood with reference to this figure. Put simply, each instruction or result pipeline stage (comprising an FCTL and an associated latch) obeys a four-phase "return to zero" (RTZ) protocol, with additional constraints to ensure that 1) a request is not sent forward until the next or receiving stage is ready to accept new data; and 2) data is not released from the current stage until the next stage has successfully latched the data.

When an instruction latch 204 in stage 2 becomes full, i.e., latches an instruction data packet, and the data is valid, the corresponding FCTL box 202 issues a request (via QI2) to mutual exclusion element (MUTEX) 206 to transmit the data packet to stage 3. MUTEX 206 corresponds to COP23. If there is no corresponding request to the MUTEX 206 from FCTL 203 in stage 3 (via QR3), then the instruction data packet will be allowed to proceed to the stage 3. The transmitting stage, i.e, stage 2, releases the transmitted instruction data packet upon receiving acknowledgement that it has been latched in the stage 3. Thus, for example, in the absence of traffic in the result (downwardly flowing) pipeline, traffic progresses unimpeded in the instruction (upwardly flowing) pipeline.

If however, MUTEX 206 receives requests from both the instruction pipeline stage in stage 2 (via QI2) and the result pipeline stage in stage 3 (via QR3), it arbitrates between the two requests, with the consequence that the requesting instruction and result packets become latched in one of the two counterflow pipeline stages (depending upon which request is granted). In this example, we will assume that the request from stage 3 was granted and both packets become latched in stage 2. In response to this condition, a full/empty box 212, detecting that stage 2 is full, i.e., that there is a data packet in both the instruction and result latches of the counterflow pipeline stage, deasserts the "done" signals, i.e., Idone2 and Rdone2, thus preventing any requests from being transmitted to the adjacent counterflow pipeline stages until any necessary interaction between the data packets has taken place. Once the interaction is complete, FEB 212 asserts the Idone2 and Rdone2 signals, allowing the flow of data to begin again. The use of four-phase level signalling allows the COP circuitry to be relatively simple as compared to a two-phase signalling implementation.

It should be noted that the IA21 output of FCTL box 202 is used to latch instruction data in the associated latch. Likewise, RA32 is used to latch result data in the corresponding result latch. These signals are also fed directly to the associated full/empty box (FEB) (as signals Li2 and Lr2) to indicate the presence of an instruction or result packet in the counterflow pipeline stage. Another point to note is that when these signals are asserted, the adjacent counterflow pipeline stages will de-assert the QI1 and QR3 signals, thereby resetting MUTEX12 and MUTEX23.

Figure 3A:
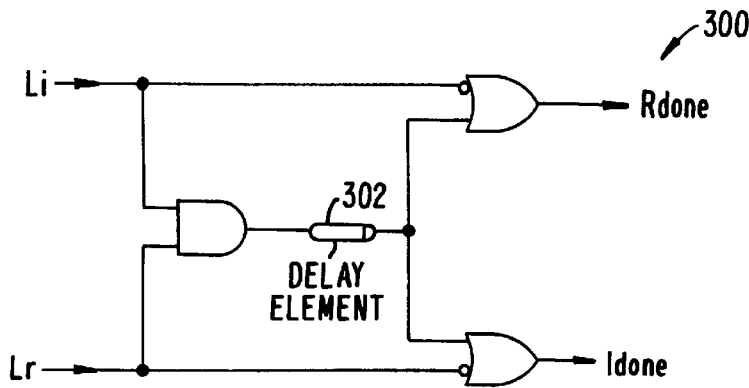
FIGS. 3(a) and 3(b) are simplified representations of the full/empty box of FIG. 2.

FIG. 3(a) shows a simplified logic diagram 300 which performs the function of an FEB as described above. The presence of an instruction packet and a result packet in the same counterflow pipeline stage (as indicated by the $L_i$ and $L_r$ signals) prevents either from leaving the counterflow pipeline stage until all garnering and/or "renraging" (discussed below) has been completed. Thus, if $L_i$ and $L_r$ are both asserted, both the Rdone and Idone signals will not be asserted until after a delay (caused by delay element 302) which is long enough for any necessary interaction between the instruction and result packets to take place. If, on the other hand, there are no result packets in the result pipeline, $L_r$ will always be deasserted and Idone will always be high, thus presenting no impediment to the flow of instructions in the instruction pipeline.

Figure 3B:
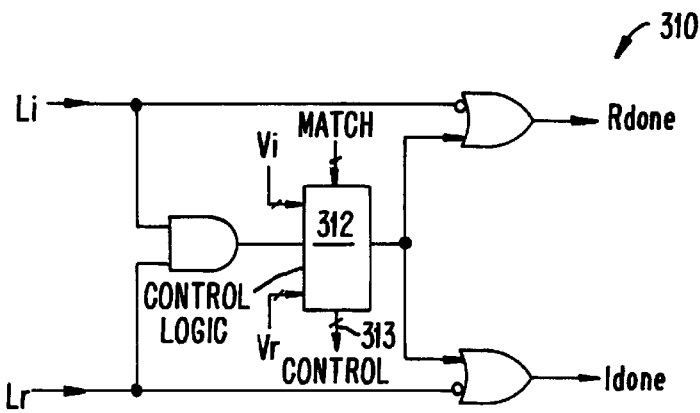

FIG. 3(b) shows a more refined FEB circuit 310 which replaces delay element 302 of FIG. 3(a) with control logic 312 which actually controls the interactions according to its various input signals. If, for example, a match between the instruction and result packets is detected (as indicated by the match input to control logic 312), the instruction data is indicated to be invalid by validity data $V_i$ (see FIG. 7), and the result data is indicated to be valid by validity data $V_r$ (see FIG. 7), a garnering operation is instigated by control logic 312 via control lines 313. As discussed above, a garnering operation is the transfer of result packet data from the result pipeline to replace corresponding instruction packet data in the instruction pipeline. Control logic 312 also provides a delay before the Rdone and Idone signals are asserted which is sufficient to permit completion of the type of operation instigated via control lines 313.

Similarly, if a match is detected between the instruction and result packets, the instruction data are valid, and the result data are invalid, a renraging operation is instigated and an appropriate delay is provided by control logic 312. As discussed above, a renraging operation is similar to a garnering operation with the roles of instruction and result reversed. The garnering and renraging circuitry is described in detail below. If the instruction and result packets produce no matches, no garnering or renraging takes place.

Figure 4A:
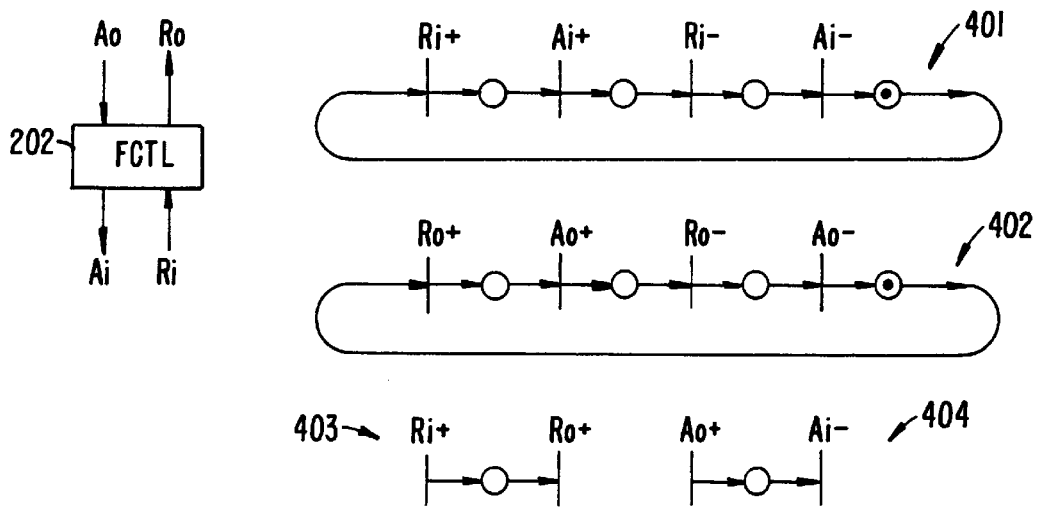
FIG. 4 is a series of Petri loops illustrating the interaction between the inputs and outputs of the FIFO control box of FIG. 2.

FIG. 4 provides the interface signal sequencing specification for the FCTLs of FIG. 2 as represented by specification diagrams 401–404. These diagrams specify the behavior of an FCTL. Signals $R_i$, $A_i$, $R_o$, and $A_o$ are generic representations of signals IR12, IA21, QI2, and IA32, respectively, of FIG. 2. Specification diagram 401 represents the required relationships between signals $R_i$ and $A_i$ irrespective of the behavior of the other signals. The vertical lines represent transitions of the signals. The direction of the transition is indicated by the sign associated with the signal name, i.e., $R_i+$ indicates a positive transition on $R_i$. In addition, a particular transition is allowed only when the bubble immediately preceding the transition (an input bubble) is filled with a token (the dot) as is the case with the bubble preceding $R_i+$. Once the allowed transition occurs, the token is removed from the input bubble and one token is placed in the output bubble associated with the transition, e.g., the $R_i+$ transition places a token in the bubble preceding the $A_i+$ transition and is therefore followed by the $A_i+$ transition. Essentially, diagram 401 says that no matter what else FCTL 202 does, the interface represented by signals $R_i$ and $A_i$ executes a four-phase handshake. Diagram 402 specifies the same relationship between signals $R_o$ and $A_o$. Diagram 403 simply specifies that $R_o$ is not allowed to go high until $R_i$ goes high. Diagram 404 specifies that $A_i$ is not allowed to go low until after $A_o$ goes high. It will be understood that the signal transitions of diagrams 403 and 404 are governed by the constraints of diagrams 401 and 402 and vice versa.

The following logic equations correspond to specification diagrams 401–404.

$$A_i \equiv L = (R_i) + (S_2 \cdot S_1) + (\overline{A}_o \cdot S_2) \qquad (1)$$

$$R_o = (\overline{A}_o \cdot S_2) + (R_i \cdot \overline{A}_o \cdot \overline{S}_1) \qquad (2)$$

$$S_2 = (R_i \cdot \overline{S}_0) + (\overline{A}_o \cdot S_2) + (S_2 \cdot S_1 \cdot \overline{S}_0) + (R_i \cdot \overline{A}_o \cdot \overline{S}_1) \qquad (3)$$

$$S_1 = (R_i \cdot A_o) + (R_i \cdot \overline{S}_2 \cdot S_1) + (S_2 \cdot S_1 \cdot A_o) \qquad (4)$$

$$S_0 = (R_i \cdot S_0) + (R_i \cdot \overline{A}_o) + (S_2 \cdot \overline{A}_o) \qquad (5)$$

Figure 5:
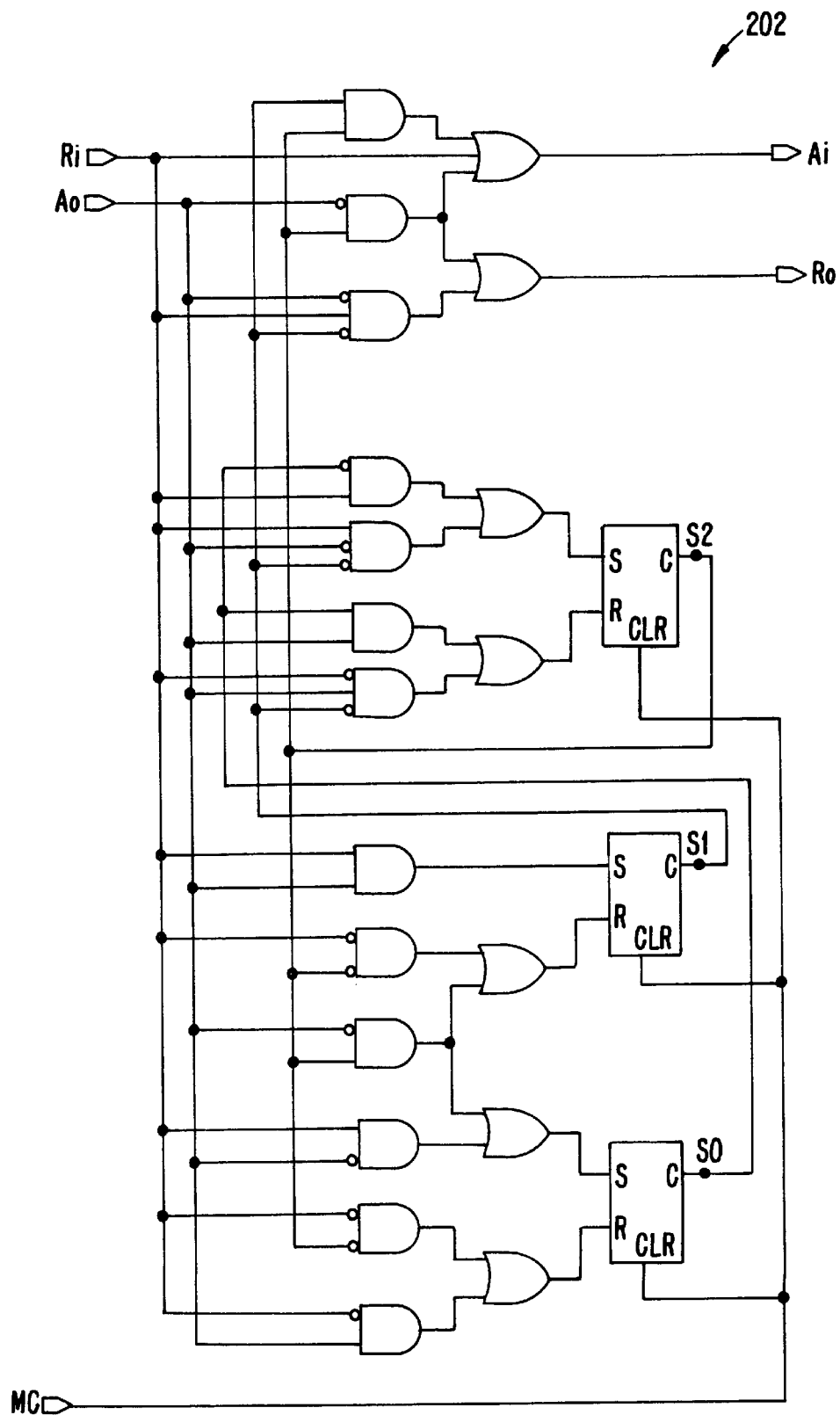
FIG. 5 is a specific logic implementation of the FIFO control box of FIG. 2.

FIG. 5 shows a specific circuit implementation of the FIFO control box of FIGS. 2 and 4 which corresponds to logic equations (1) through (5).

II. The Datapath

Figure 6:
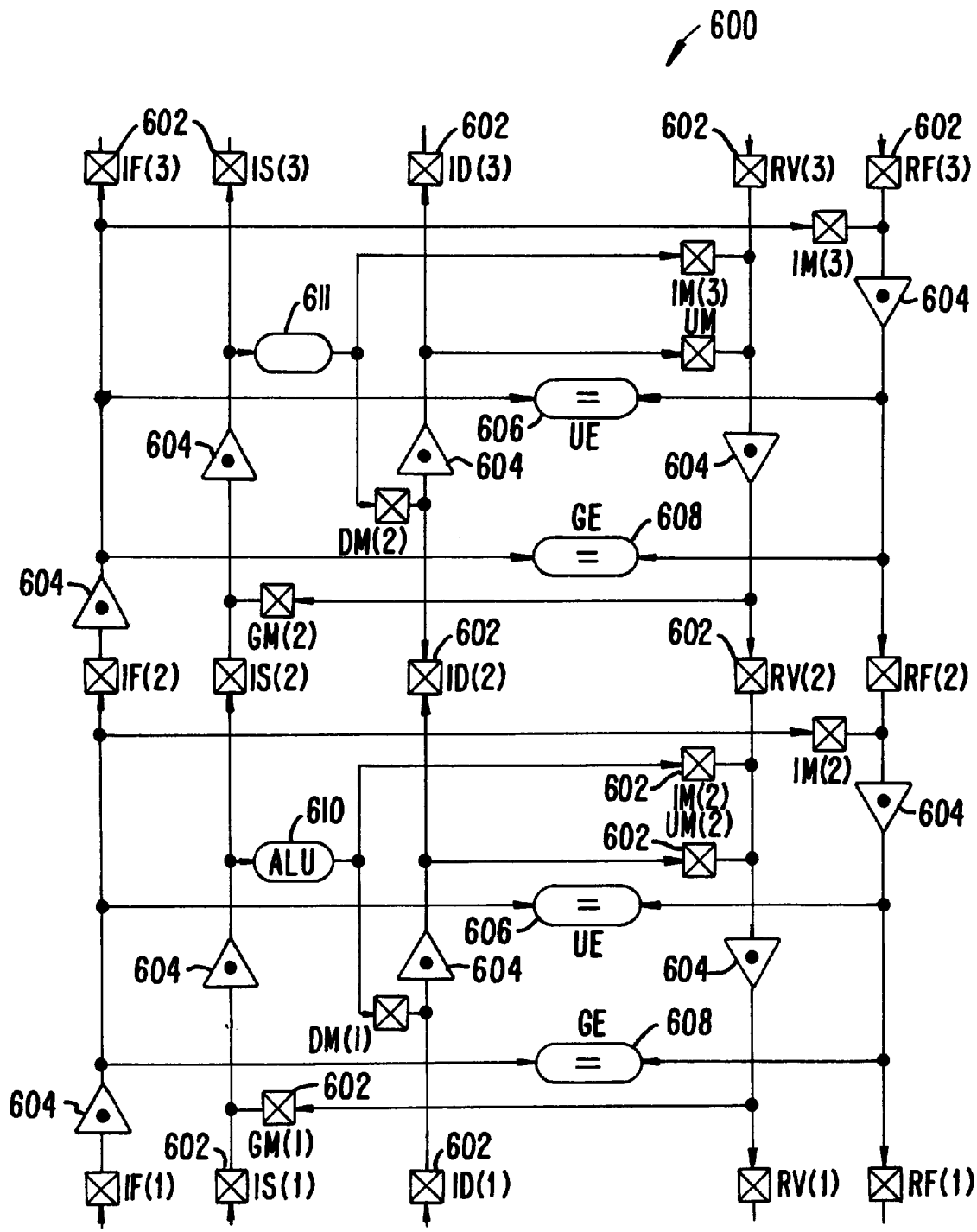
FIG. 6 is a more detailed representation of the data paths of the counterflow pipeline of FIG. 2.
Figure 7:
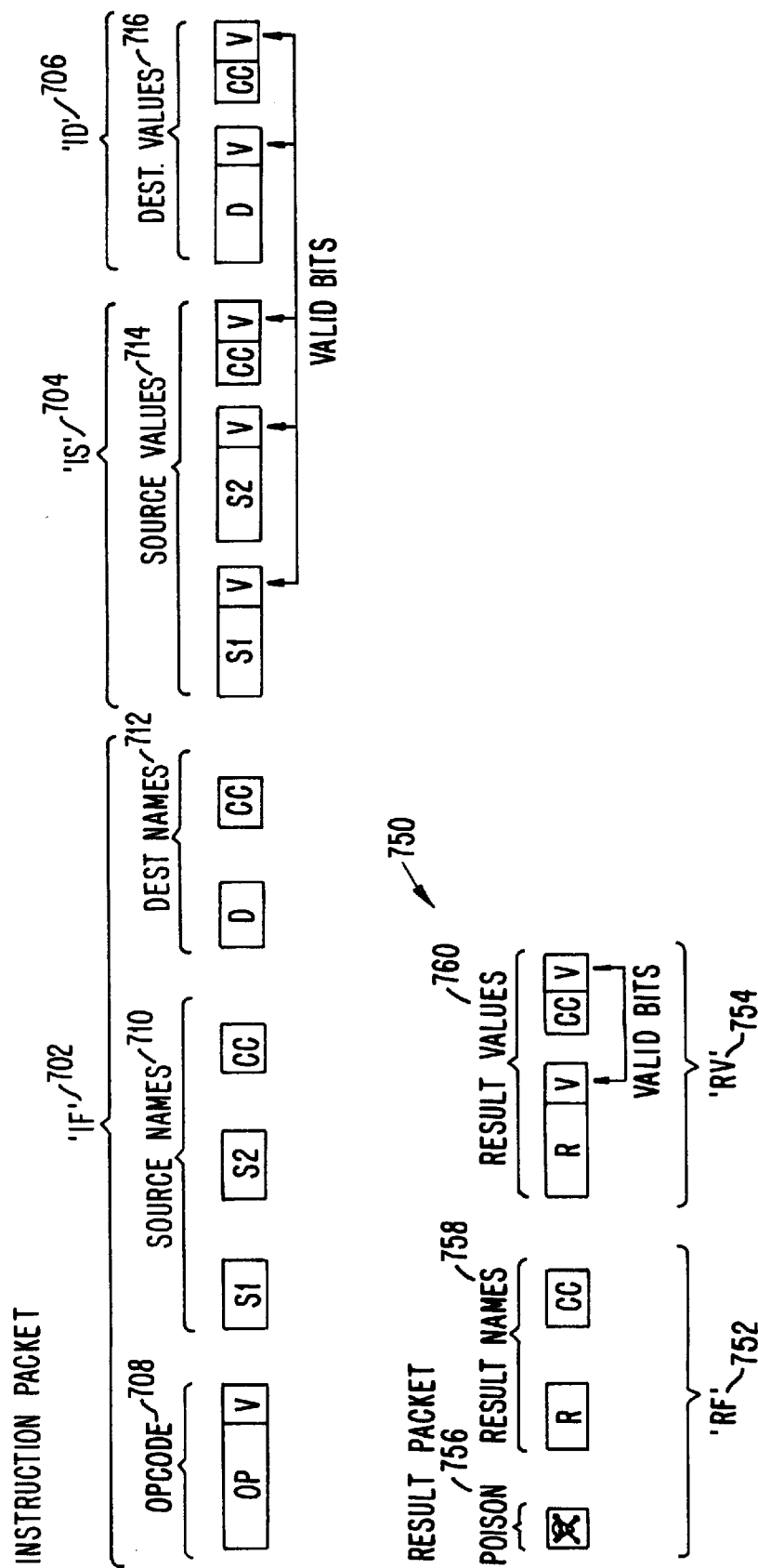
FIG. 7 provides representations of the structure of an instruction packet and a result packet.

FIG. 6 shows a specific embodiment of a datapath 600 for implementation of the counterflow pipeline of FIG. 2. FIG. 7 shows the formats (700 and 750) of the instruction and result data packets which correspond to the labels across the top and bottom of FIG. 6. It will be understood that datapath 600 and formats 700 and 750 are only some of the many datapath structures and packet formats which may be employed with the present invention, and that the present invention is not limited to this structure or these formats. Likewise, the scope of the present invention includes any type of processor design which includes a counterflow pipeline as described herein.

Each instruction packet 700 comprises a fixed portion (IF) 702, a source portion (IS) 704 and a destination portion (ID) 706. IF 702 includes an opcode field 708, source name fields 710, and destination name fields 712; IS 704 includes source value fields 714; and ID 706 includes destination value fields 716. Each result packet 750 comprises a fixed portion (RF) 752, and a result portion (RV) 754. RF 752 includes a poison bit 756, and result name fields 758; RV 754 includes result value fields 760. Each of the different portions of the instruction and result packets includes a condition code register for indicating whether a condition is true or false. The condition code registers may be employed, for example, to indicate whether a branch condition has occurred. In various embodiments, the condition code registers may comprise two-bit registers, i.e., one condition code bit and one validity bit, or full size registers, e.g., 32 or 64-bit, which may be used for other purposes.

When an instruction packet encounters a result packet in which poison bit 756 has been set, the instruction "commits suicide" and is not allowed to execute. Poison bit 756 is set, for example, when the pipeline processor determines that in executing a branch instruction it has predicted wrongly which instruction stream to follow. When this happens, a poison result is inserted into the result pipeline which "kills"

all instructions in the instruction pipeline from the wrongly chosen instruction stream. For additional information regarding the function and use of poison bit 756, please refer to the specification of U.S. patent application Ser. No. 08/477,533 which was incorporated by reference above.

According to a specific embodiment, all data in an instruction or result packet is latched when the packet arrives in a stage regardless of its validity as indicated by validity bits, V.

The flow of data in and between the instruction and result pipelines of datapath 600 of FIG. 6 is controlled by transmission gates 602. The different types of control circuitry for transmission gates 602 are not shown in FIG. 6 for simplicity but will be discussed below. Moreover, each transmission gate is identified by a two-letter abbreviation which designates the function of the gate and the different types of control circuitry associated therewith. For example, transmission gates identified by IF, IS, ID, RF, and RV correspond to gates which transmit the correspondingly identified portions of the instruction and result packets as described above. GM refers to a "garner mux" for transmitting data from the result pipeline to the instruction pipeline, IM refers to an "insert mux" for inserting data into the result pipeline, UM refers to an "update mux" for transmitting data from the instruction pipeline to the result pipeline, and DM refers to a "destination mux" for inserting data into the instruction destination field of an instruction packet. The numbers in parentheses following these abbreviated labels in indicate the counterflow pipeline stage with which the transmission gate is associated.

Selected transmission gates 602 combine with associated "sticky" buffers (or keepers) 604 to form latches for latching portions of either an instruction packet or a result packet in a particular counterflow pipeline stage. Buffers 604 statically maintain data on their inputs when the associated transmission gate is open. UE 606 decodes the opcode from the fixed portion of an instruction packet (IF) latched in the corresponding stage to determine whether the instruction must be executed in the current stage. GE 608 compares the fields from the fixed parts (IF and RF) of instruction and result packets latched in the same stage to determine whether a garner or renrag operation is necessary. If a garner operation is determined to be necessary, result values are transmitted to the appropriate source value field(s) via transmission gate 602(GM).

At such time as all of the source fields of an instruction become valid, ALU 610 may be enabled to perform the prescribed operation and place its result in the destination field of the instruction via a transmission gate 602(DM). The result is then carried up to a register file at the end of the instruction pipeline. If a renrag operation is determined to be necessary because of a particular result packet encountered by the instruction on its way up the pipe, the computed result is placed in the result value field of the encountered result packet via a transmission gate 602(UM) for use by subsequent instructions. The computed result is also inserted into the result pipeline in the stage of execution (as discussed below) via a transmission gate 602(IM). It will be understood that different stages may have different functional blocks in place of ALU 610, e.g., execution unit 611, depending upon the type of operation to be performed in that stage, and further that the operation prescribed by a particular instruction will be performed only if its opcode corresponds to the functional block in the stage. For example, execution unit 611 may be a multiplier or a memory interface. Alternatively, selected stages may be operational to perform a plurality of operation types.

The conditions under which datapath 600 operates require at least three different types of transmission gate control circuitry. These are illustrated in FIGS. 8(*a*), (*b*), and (*d*). FIG. 8(*a*) shows the control circuitry 800 for transmission gates 602 in FIG. 6 labeled IF, IS, ID, RF and RV. Data are received via the $D_i$ path and transmitted to an associated sticky buffer 604 via the $D_o$ path. These gates are controlled only by a single control signal L, i.e., the $L_i$ and $L_r$ signals discussed above with reference to FIGS. 2 and 3. The default condition for these gates is closed, i.e., transparent. In this figure, the signal G represents the delayed acknowledge signal to the next pipeline stage as discussed above with reference to FIG. 2.

FIG. 8(*b*) shows control circuitry 820 for transmission gates 602 in FIG. 6 labeled GM, UM and DM. Like the gates described with reference to FIG. 8(*a*), data are received via the $D_i$ path and transmitted to their destination via the $D_o$ path. However, these gates have a more complicated control regime to generate a short pulse on the L signal line to facilitate, for example, a garner operation via one of transmission gates 602 (GM). The default condition for these gates is open, i.e., opaque. The timing diagram of FIG. 8(*c*) illustrates the operation of control circuitry 820 in response to an input request on signal line Lreq.

FIG. 8(*d*) shows control circuitry 840 for transmission gates 602 in FIG. 6 labeled IM (i.e., the insert muxes). Performing an insert into the result pipeline is complicated because in order to insert result data, the result stream must be, in effect, halted to create space for a new item. This is done by blocking upstream results from entering the stage using the COP circuitry above the stage and waiting for any result currently in the stage to leave. Essentially, control circuitry 840 is a combination of circuitry 800 and 820. As an example, an input request (signal Rinsert) to the control circuitry for gate 602 (IM(2)) causes gate 602 (RV(2)) (represented by gate 842) to open, and then gate 602 (IM(2)) (represented by gate 844) pulses closed as described with reference to FIGS. 8(*b*) and (*c*). Obviously, the default condition for this type of gate is open, i.e., opaque.

III. Garnering and "Renraging"

Figure 9:
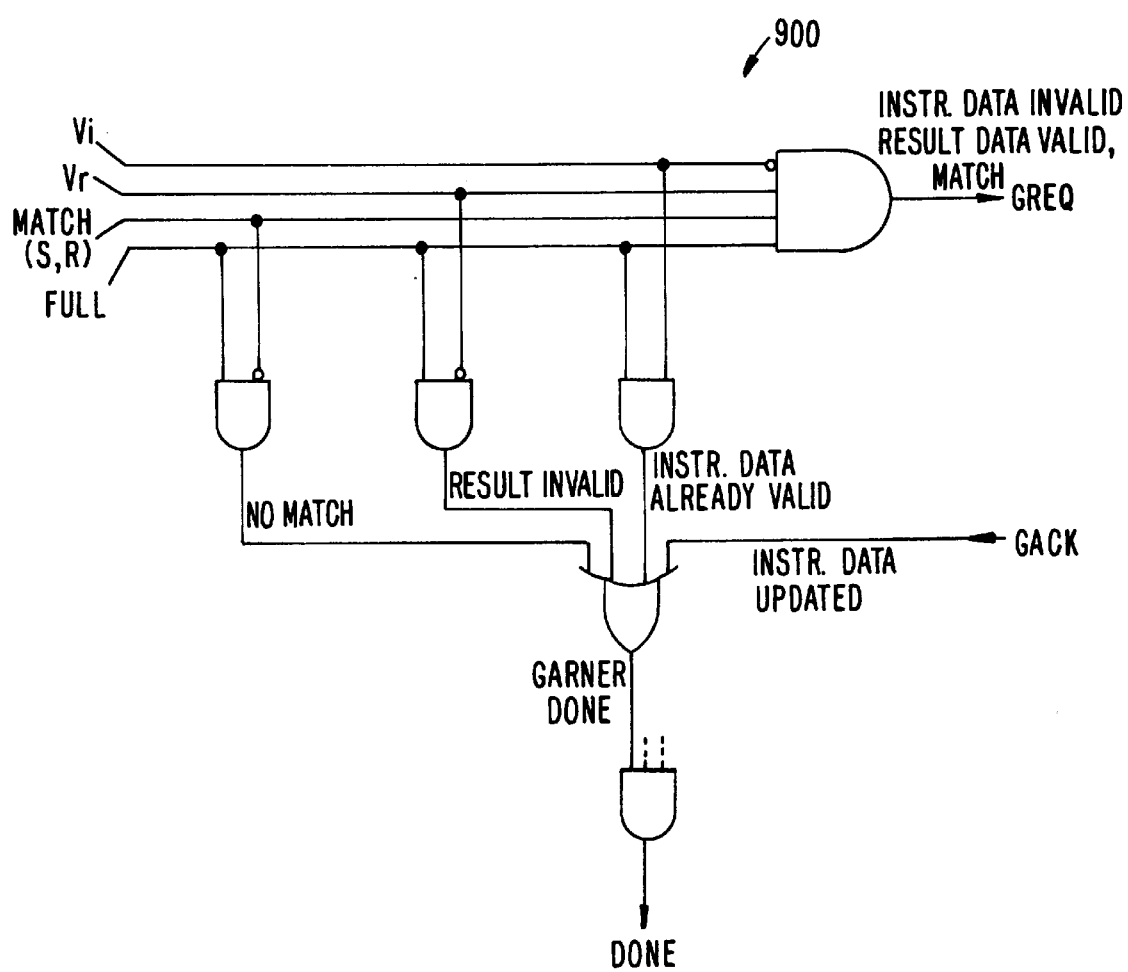
FIG. 9 is a simplified schematic of a garner circuit.

The basic garnering circuit 900 is shown in FIG. 9. According to a specific embodiment of the invention, there is one garnering circuit 900 for each possible combination of instruction latch and result latch between which a data transfer may be required. Because the data validity bits of the result are transferred along with the data, no separate validity bit handling is needed. As will be understood with reference to FIG. 9, if (1) a counterflow pipeline stage is full, i.e., has an instruction packet and a result packet latched, (2) a match between a source and a result register is found, (3) the instruction data are invalid (as indicated by $V_i$), and (4) the result data are valid (as indicated by $V_r$), then a garner request signal (GREQ) is issued. The GREQ signal is acknowledged by a garner acknowledge (GACK) signal which causes a garner done signal (GDONE) to be asserted. GDONE is also transmitted if no match is found, if the result data is invalid, the instruction data is valid, or a garnering operation has been completed and GACK has been received.

Figure 10:
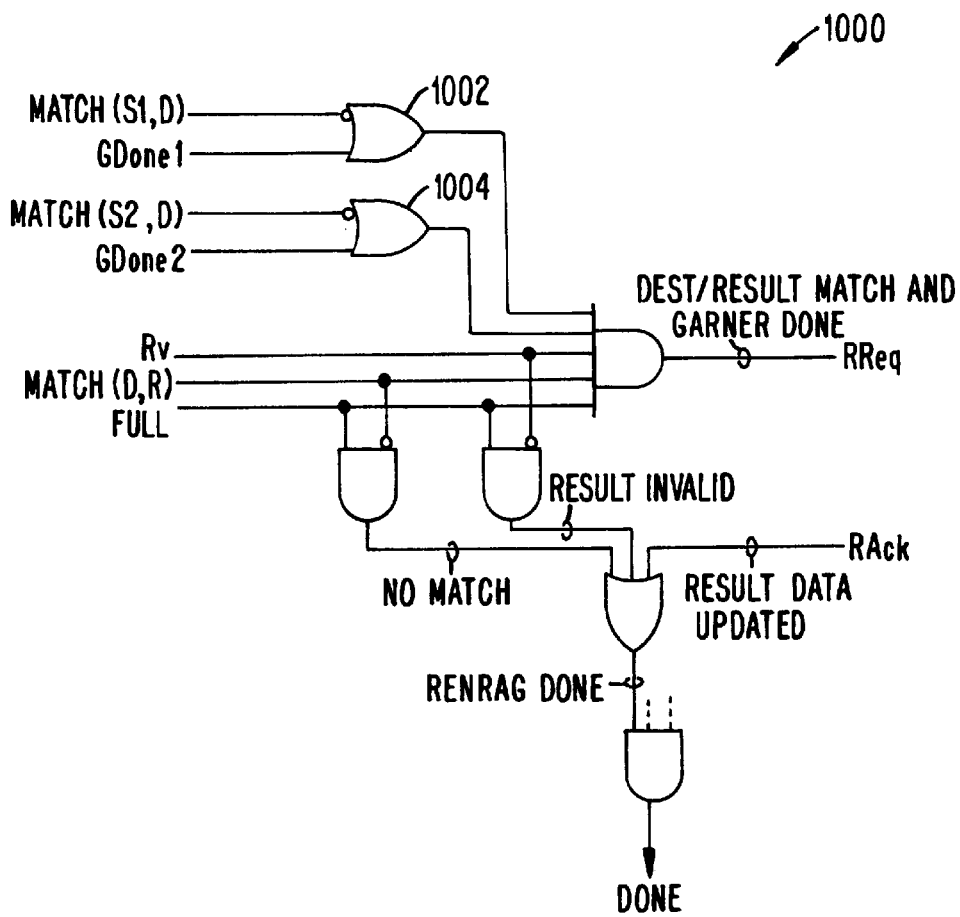
FIG. 10 is a simplified schematic of a "renrag" circuit.

The basic renraging circuit 1000 for transferring data from an instruction destination field to a result packet is shown in FIG. 10. Note that the instruction data validity bit is not an input to this circuit. This is because a renrag operation takes place whenever a destination field and valid result match occurs regardless of the validity of the instruction data. In the interest of keeping the design as simple as possible, the complete destination field is transferred to the result packet in either case. If the destination field is valid, a result "update" occurs. If the destination field is invalid, the result is invalidated. Thus, a renrag request is issued (RREQ) if a match is found between an instruction destination field and a result field and any necessary garnering operations have taken place as indicated by OR gates 1002 and 1004, which provide garner/renrag sequencing control. A renrag done signal (DONE) is transmitted if there is no match found between the instruction destination register and the result, the result is invalid, or a renrag acknowledge signal (RACK) is received.

OR gates 1002 and 1004 are necessary to account for the case where one or both sources of an instruction have the same register identification as the destination. When a matching, valid result is encountered, the garner operation must take place before the renrag. The circuit shown is intended to sequence the garner/renrag processes under such conditions. In the majority of cases these operations are allowed to proceed in parallel.

Figure 11:
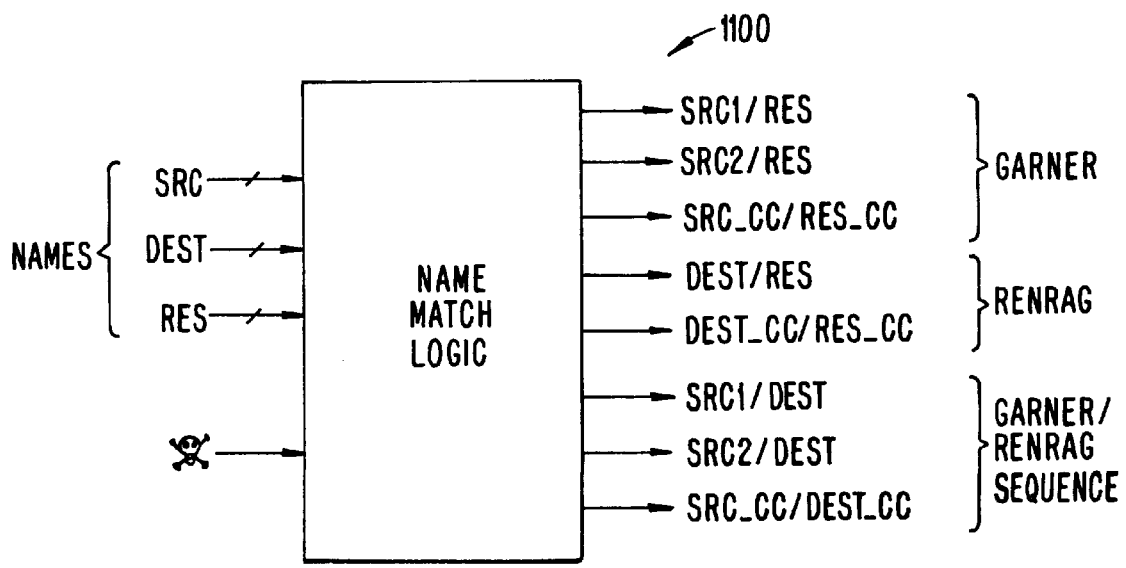
FIG. 11 is a simplified block diagram of circuitry for comparing the register fields of instruction and result packets.

FIG. 11 shows a block diagram of match logic 1100 which generates the match inputs to the garner and renrag control circuits of FIGS. 9 and 10. These match signals are valid by the time the counterflow pipeline stage becomes officially "full" as detected by the FEB. Also, the time between when one instruction exits a particular stage and the next enters is sufficient to allow all "garner done" signals to fall to zero. The match logic also receives the poison bit from the result packet as an input which, when set ensures that a match will be detected for every instruction. The purpose of this feature is discussed below with reference to the "killing" of instructions.

IV. Instruction Execution

According to a specific embodiment of the invention, there is only one stage in which a particular type of operation may be performed. Therefore, when a given type of instruction reaches the stage in which it must be executed, it remains in that stage until the operation is performed. Once the operation has been performed, the instruction may issue a request to move to the next stage. If the instruction arrives in the stage without its full complement of valid source data, it must wait in that stage until the source data become valid.

According to another specific embodiment, there are multiple pipeline stages which are capable of executing a given instruction. An instruction is allowed to make a request to move to the next stage only when it will not execute in the current stage or it has completed executing. In a first alternate embodiment, when an instruction arrives in a stage capable of executing it without its full complement of valid source data, it issues a signal to the next COP requesting permission to exit. If, however, a subsequent garner operation in the current stage causes the instruction to be ready to execute, the request to exit is "withdrawn". In a more specific embodiment, additional arbitration takes place to decide whether to execute the instruction in the current stage or move on. In a second alternate embodiment, execution is initiated with the provision that the execution (and subsequent insertion) may be aborted at any time. In yet another alternate embodiment, execution is delayed until the instruction reaches another stage which is capable of executing it.

V. Killing of Instructions/Results and Insertion of Results

"Killing" of instruction and result packets is the process whereby packets are removed from the pipeline at some location other than the two ends. Killing is accomplished by allowing a stage to unlatch the data it is holding without that data being latched by a succeeding stage. Although this mechanism is used for the killing of both instruction and result packets, the reasons for killing the two different packet types are quite different. Killing a result packet is done for efficiency reasons, i.e., to avoid wasting result pipe bandwidth transporting invalid data. This condition is detected when all data validity bits associated with a given result packet are low (refer to FIGS. 7 and 13(*b*)).

By contrast, the killing of an instruction is done out of necessity when a trap occurs, or when a speculative execution path is invalidated due to a mispredicted branch. An instruction is tagged for death when the validity bit associated with its opcode is set low. This occurs whenever the instruction garners the "poison" bit associated with a result packet. The match circuitry of FIG. 11 guarantees that a poison result matches every instruction it encounters.

In either case, care is taken to ensure that an instruction or result which is scheduled to be killed does not modify any other data items it encounters before the killing is accomplished. The mechanism for performing the pipeline kill is discussed in more detail below.

Figure 8A:
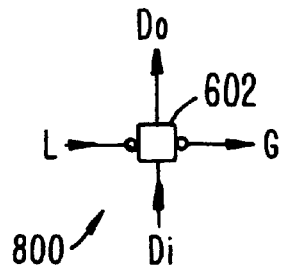
FIGS. 8(a)–(d) illustrate the different types of transmission gates required for the data paths of FIG. 6 and the control circuitry associated with each.
Figure 8B:
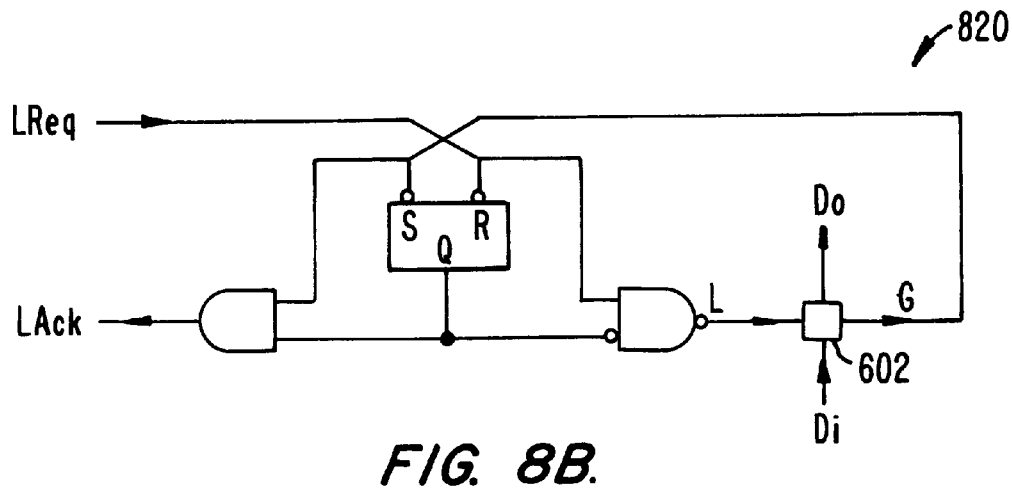
Figure 8C:
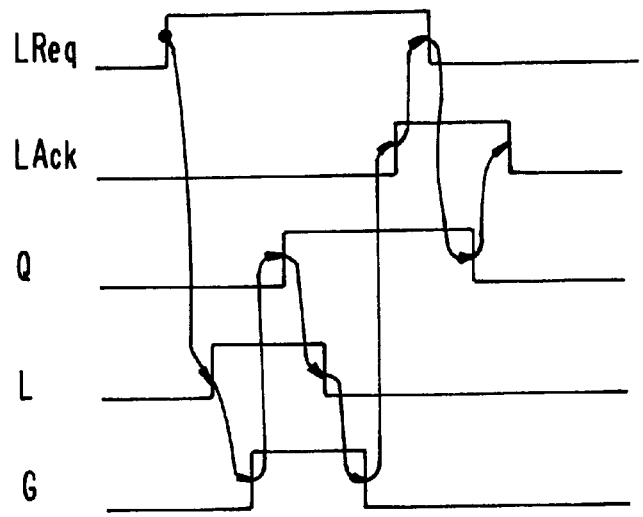
Figure 8D:
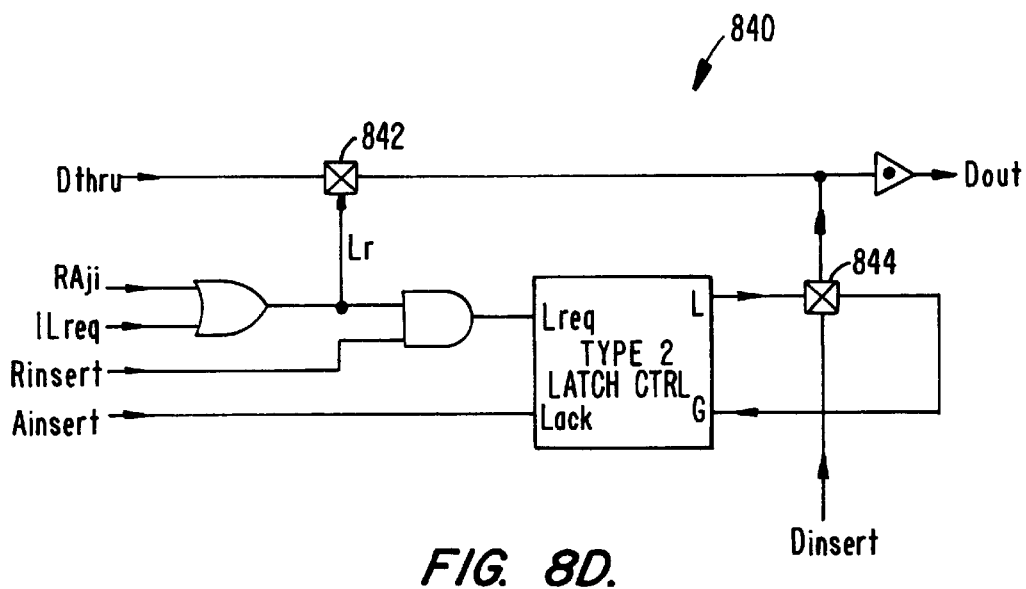

Insertion of a computed result value into the result pipeline is initiated when the instruction which has generated the value obtains permission from the COP above to exit the current stage. At this point, it is known that no new results will be permitted to enter the stage from above. Therefore, after any result currently residing in the stage has left, the new result may be latched via transmission gate 602(IM) (FIG. 6) using latch control circuitry 840 (FIG. 8*d*). When the insertion has been completed, the instruction is then allowed to exit the stage.

It should be noted that the result is inserted into the same stage as the instruction which produced it. One motivation for this is the high percentage of instructions which typically require as a source operand the result of an instruction immediately preceding it in program order. If it happens that the two instructions also utilize the same execution unit, there may be a performance advantage if the second instruction moving into a stage finds one of its needed operands already present and available for garnering. According to a specific embodiment, a succeeding instruction is allowed to move into a stage before an inserted result is allowed to leave.

Figure 12A:
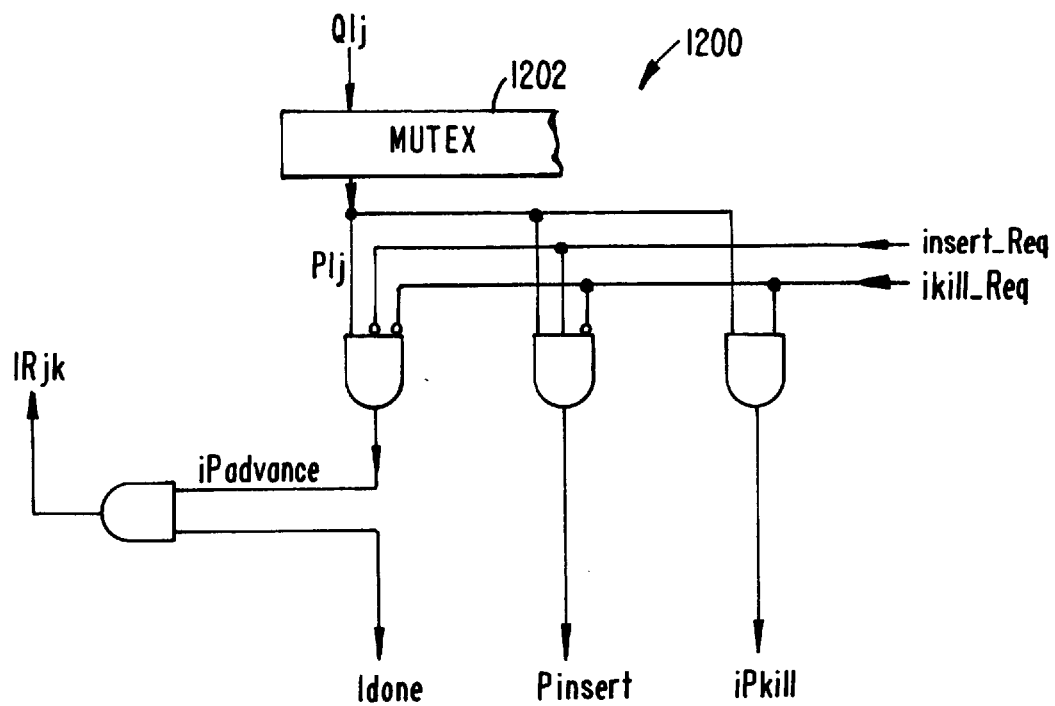
FIGS. 12(a) and (b) are simplified schematics of "permission steering" logic designed according to a specific embodiment of the invention.

The killing of instructions and results and the insertion of results will now be described with reference to FIGS. 12–14. The main idea is that the P or "permission" signal from the COP is blocked from reaching the succeeding stage and is instead used to initiate further processing within the same stage. In the case of insertion, this signal, labelled Pinsert in the figures, triggers the latching of the ALU output into the result latch of the current stage. When latching is complete, the P signal is "unblocked", triggering instruction exit from the current stage. An additional signal labelled BlockR is asserted to the preceding result pipe stage to prevent new results entering the stage until the inserted result has left.

In addition, the Radvance signal is cleared, preventing the newly inserted result from making a request to the COP below until the instruction has left. This virtually guarantees that if an instruction is waiting to gain entry to the stage, it will be allowed in before the inserted result has a chance to leave. This feature is implemented to reduce latency in the case of tight instruction dependencies as discussed above.

In the case of instruction/result killing, the steered P signal, now called Pkill, is merged with the latch signal which is normally produced by the succeeding stage. This "tricks" the current stage into thinking that it has been relieved of responsibility for the data and so may unlatch it.

FIGS. 12(*a*) and (*b*) shows details of the permission signal steering logic 1200 and 1250 for the instruction and result pipes, respectively. Logic 1200 detects the arrival of an instruction grant from the next MUTEX 1202 and determines what action should next be performed. If no insert or instruction kill operation is pending, the iPadvance signal, and thus the $P_i$ signal, is asserted. This eventually results in the unlatching of the instruction in the current stage. A pending insert or kill operation, i.e., insert_req or ikill_req is asserted, overrides the assertion of $P_i$. In the case of a pending insert, $P_i$ is issued when the insert_req flag is lowered signalling the completion of the insert operation. In the case of a pending kill operation, the ikill_req flag remains asserted until the Pkill signal goes low (see FIG. 14(b)), and therefore, the $P_i$ signal will never be issued. Note that a pending kill operation overrides and cancels a pending insert.

Figure 12B:
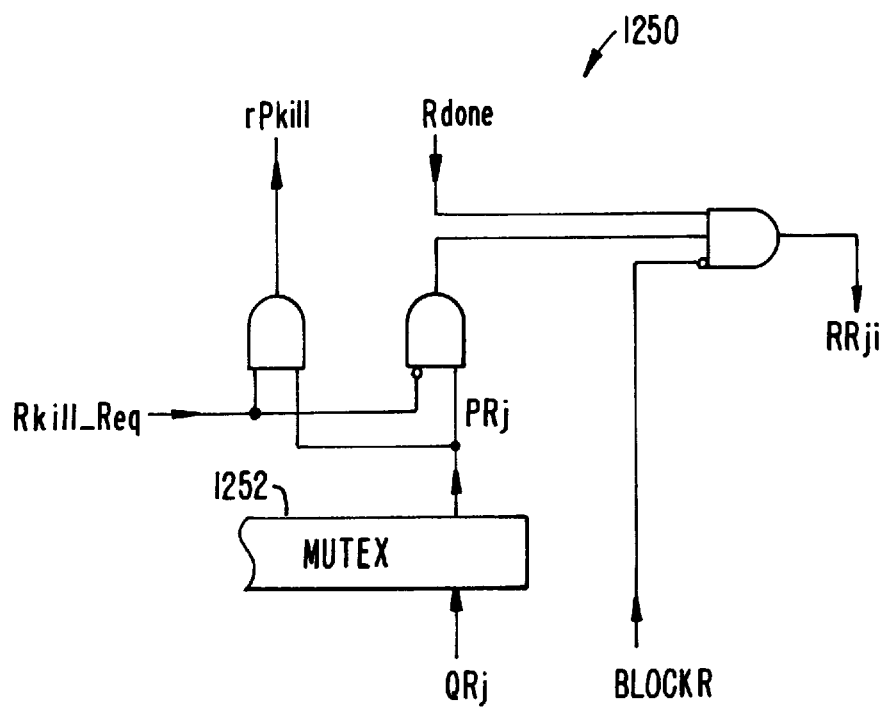

Logic 1250 of FIG. 12(b) operates similarly to logic 1200 in that it detects the arrival of a result grant from MUTEX 1252 and determines whether and when the permission signal, $P_r$, should be transmitted. However, because there are no insert operations for instructions, there is no need for the insert_req signal or its associated circuitry. There is one additional signal, the BlockR signal, which is generated during the insertion process in the stage below (see FIG. 13(a)). By preventing the assertion of $P_r$ with the BlockR signal, results from the previous stage in the result pipeline are blocked from entering the stage until the inserted result has been released.

Figure 13A:
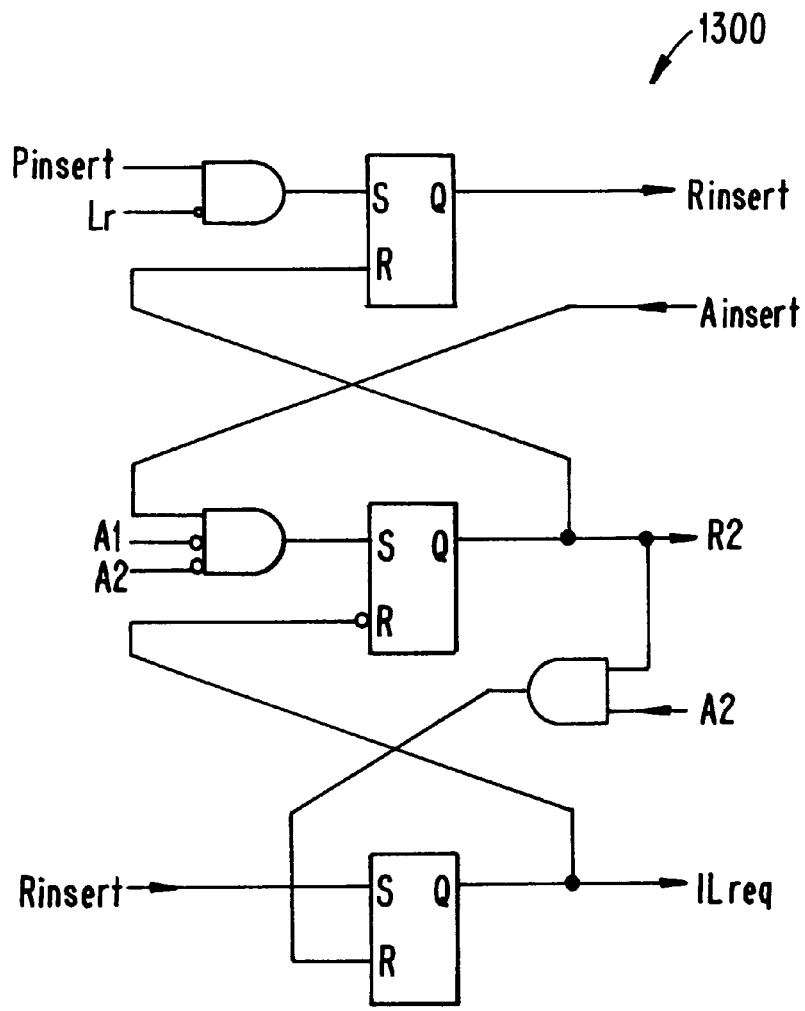
FIGS. 13(a)–(d) are simplified schematics of control logic for generating various control signals according to a specific embodiment of the invention.
Figure 13A:
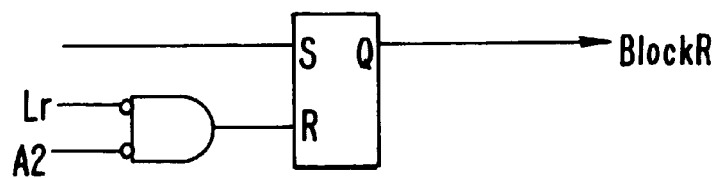

Insert control circuit 1300 of FIG. 13(a) generates control signals which regulate the insertion of values into the result pipeline. Pinsert (generated by logic 1200 of FIG. 12(a)) indicates that an insertion should be initiated. A high level on $IL_r$ indicates that a previous result is still present in the stage. When $IL_r$ falls low, Rinsert is asserted and the data transfer is started. The ILreq signal is also asserted which shields the inserted result data from result data attempting to enter the stage from the previous result pipeline stage. Ainsert going high indicates that the data transfer is complete and that valid data are present in the result latch. BlockR is set to prevent new results from entering the stage from the previous stage (see FIG. 12(b)). At this point, the instruction is allowed to exit the stage.

Figure 14:
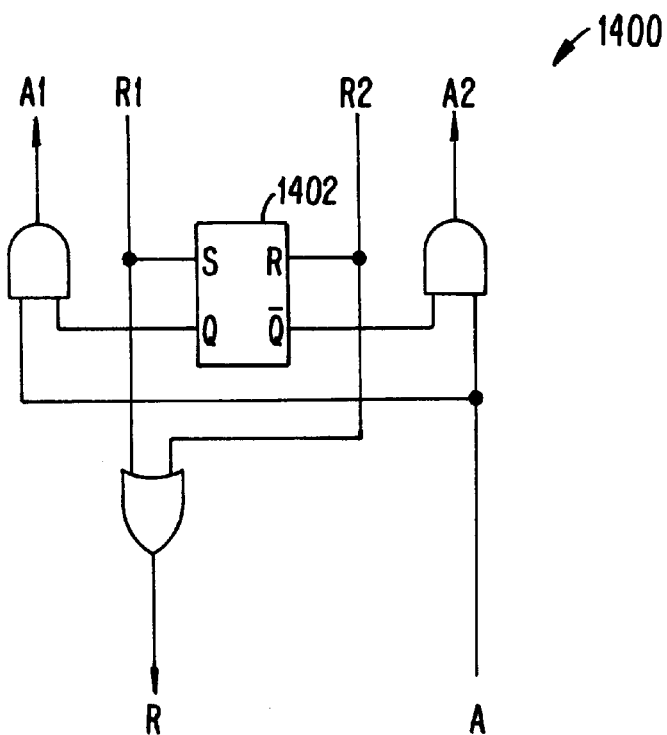
FIG. 14 is a simplified schematic for four-phase "call" module for use with a specific embodiment of the invention.

A handshake is then performed on the R2/A2 signal pair which is one of the interfaces with call module 1400 of FIG. 14 (R1/A1 is the other). In effect, call module 1400 merges the two result streams. When both interfaces have become idle, i.e., both A1 and A2 are low, R2 is asserted. A rising edge on A2 indicates that the inserted data have been latched in the next stage. In response, ILreq goes low and R2 is cleared. Once the through path for results is transparent as indicated by $IL_r$ going low, BlockR is cleared and new results are allowed to enter from the previous result pipeline stage.

Call module 1400 of FIG. 14 receives mutually exclusive request signals R1 and R2 as inputs. One sets and one clears flip-flop 1402 indicating which request is pending. Each request signal also causes output request signal R to be set. The answering acknowledge signal A is routed to A1 or A2 depending upon which output of flip-flop 1402 is set.

Figure 13B:
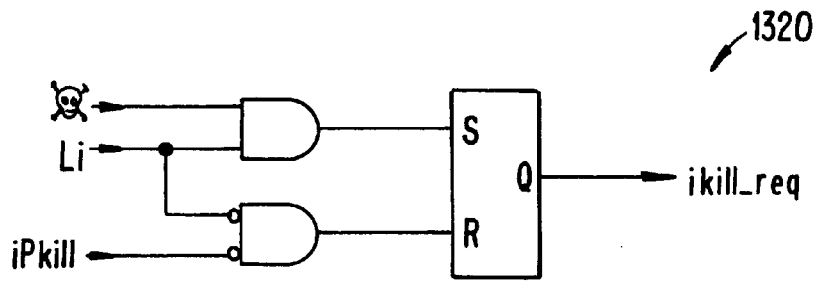
Figure 13B:
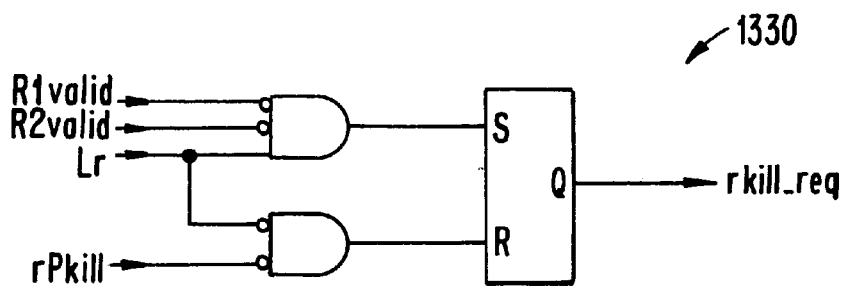

Referring now to FIG. 13(b), the kill control circuits for both instructions (1320) and results (1330) is shown, the purpose of which is to generate ikill_Req and rkill_Req, respectively. Each of these signals indicates that a kill operation is pending. Each counterflow pipeline stage has an instruction kill control circuit 1320 and a result kill control circuit 1330. For instructions, $L_i$ goes high when an instruction is latched in the stage. If the Kill signal (i.e., the skull and crossbones) subsequently goes high indicating that the instruction has met a "poison" result, the ikill_req flag is set. The instruction grant logic 1200 of FIG. 12(a) then initiates the kill operation when iPkill is asserted. When $L_i$ and iPkill are both low, indicating that the instruction latch is empty and idle, the ikill_req flag is reset. Kill control circuit 1330 operates similarly for results. As discussed above, the main difference is the reason for which results are killed, i.e., results are killed for performance reasons only; there is no functional requirement to remove them from the result stream. For results, the rkill-req signal is generated in response to all of the data fields of a particular result packet being marked invalid rather than the Kill signal going high.

Figure 13C:
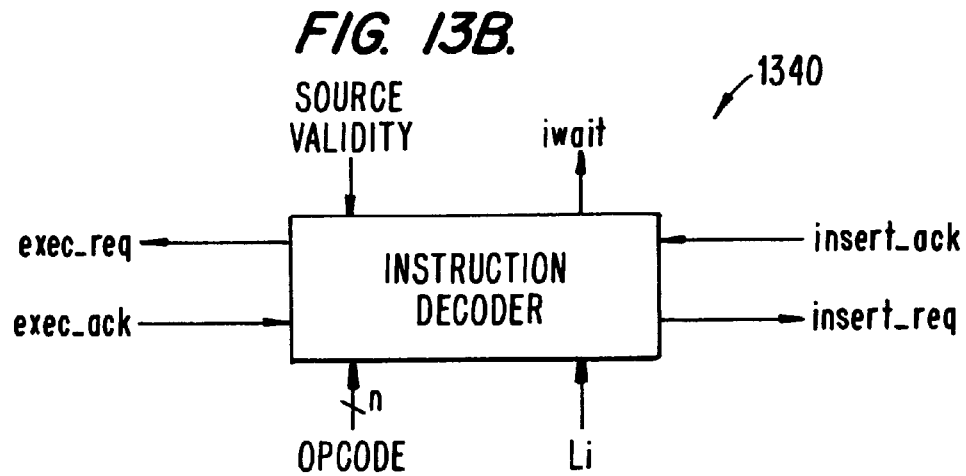

FIG. 13(c) shows instruction decoder 1340 which monitors the instruction OPCODE (validated by $L_i$) to determine if the current stage must execute the instruction. If not, no action is taken. If so, iwait is asserted which blocks the instruction request to the COP. If insert_req is asserted, this indicates that an insertion is pending which will occur when the instruction has been executed. Instruction decoder 1340 waits for the source validity bits to become valid before it asserts exec_req. Exec_ack clears iwait and exec_req, and insert_ack clears insert_req.

Figure 13D:
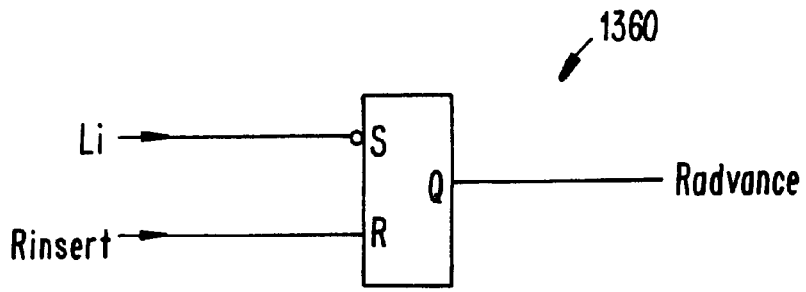

The Radvance signal generated by result advance logic 1360 (FIG. 13(d)) is used to distinguish between a through result in a stage, i.e., a result transmitted from the previous stage, and a result which has just been inserted. It prevents any attempt to perform a garner or renrag operation between an inserted result and the instruction which generated the inserted result. Radvance is set when an insertion is in progress as indicated by Rinsert going high. Radvance is reset when $L_i$ goes low indicating that the instruction which generated the inserted result has left the stage. A subsequent instruction entering the stage encounters a low Radvance and proceeds with any necessary garner or renrag operation in a normal manner.

Figure 15A:
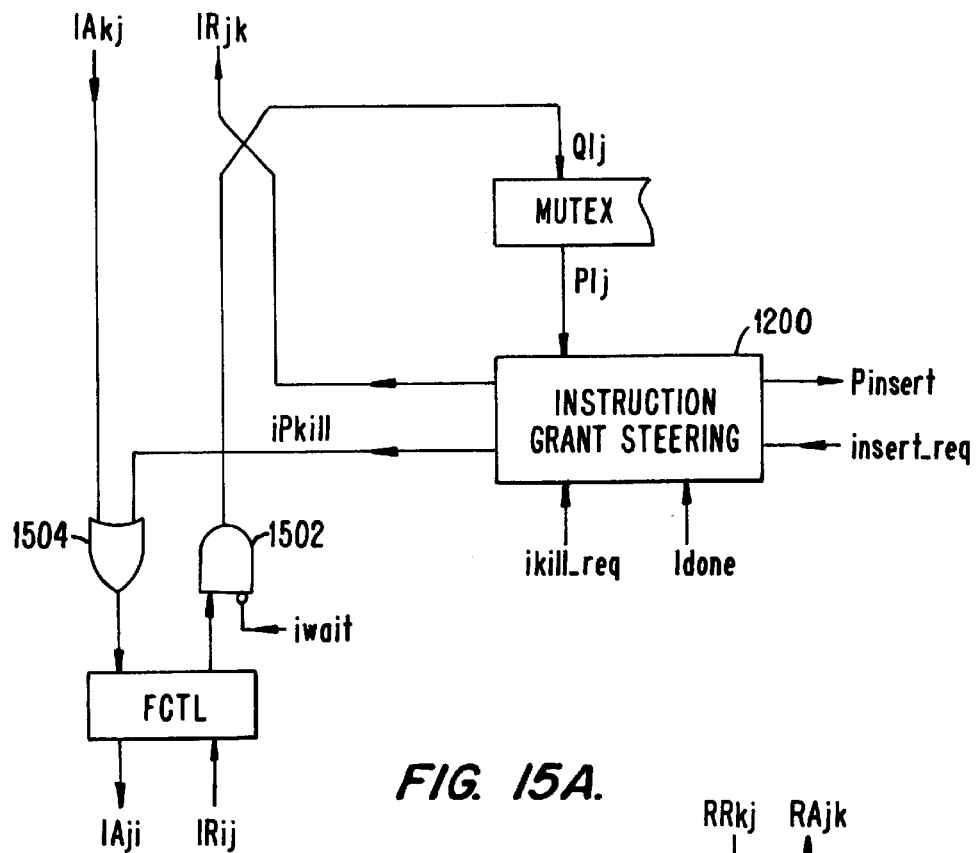
FIGS. 15(a) and (b) are more detailed block diagrams of the instruction and result pipelines of FIG. 2.

FIGS. 15(a) and (b) show more detailed block diagrams of portions of the instruction and result pipelines, respectively, of FIG. 2. The counterflow pipeline stage corresponding to these figures as indicated by the various subscripts is a stage j which is between stages i and k. In FIG. 15(a), AND gate 1502 stalls the instruction when it must be executed in the stage. OR gate 1504 kills the instruction when required. Box 1200 in FIG. 15(a) corresponds to instruction grant steering logic 1200 of FIG. 12(a).

Figure 15B:
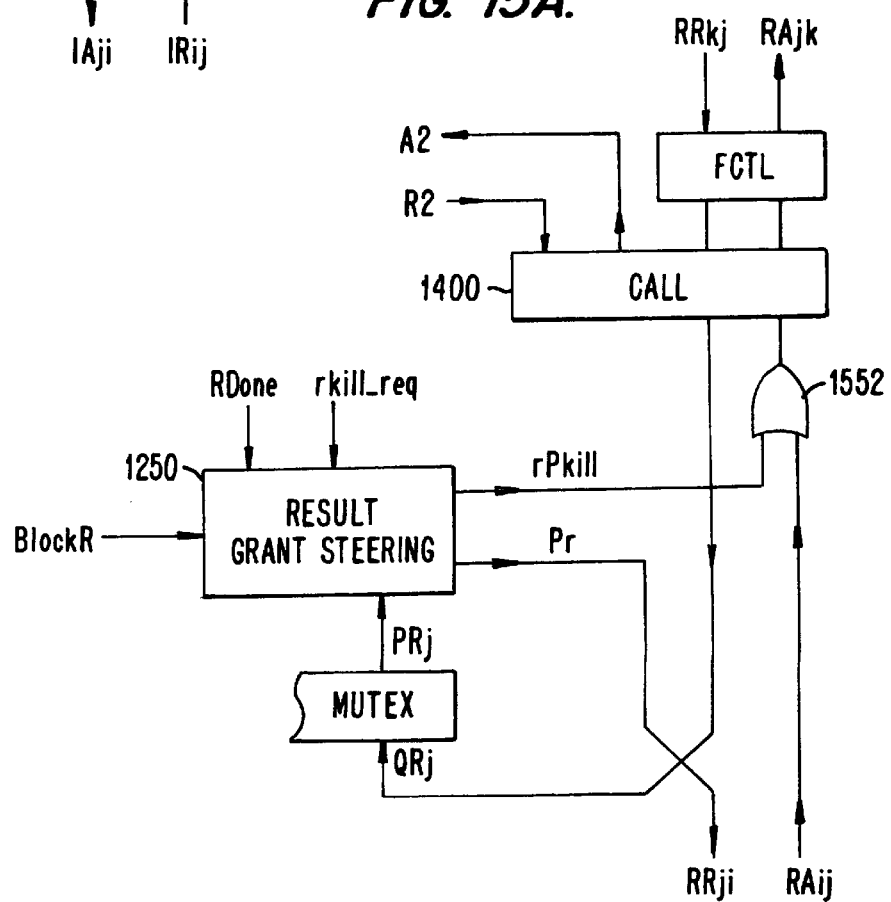

In FIG. 15(b), OR gate 1552 kills results when required. Block 1400 corresponds to call module 1400 of FIG. 14 and is used for facilitating insertion of results. Block 1250 corresponds to result grant steering logic 1250 of FIG. 12(b).

VI. Additional Considerations

The latching of computed data into the instruction destination register will now be discussed. Intuitively, one would think that the data is latched as soon as the computation is finished. Unfortunately, a race condition may arise if a result present in the stage was in the process of initiating a renrag cycle as a consequence of a destination match. To avoid such a situation, a specific embodiment of the present invention waits to update the destination register until the insertion cycle begins. In fact, the Rinsert signal used to operate the IM transmission gate control is applied to the transmission gate control circuit associated with the DM path. According to a more specific embodiment, the two separate acknowledge paths are ANDed to ensure that both operations are complete.

Figure 16:
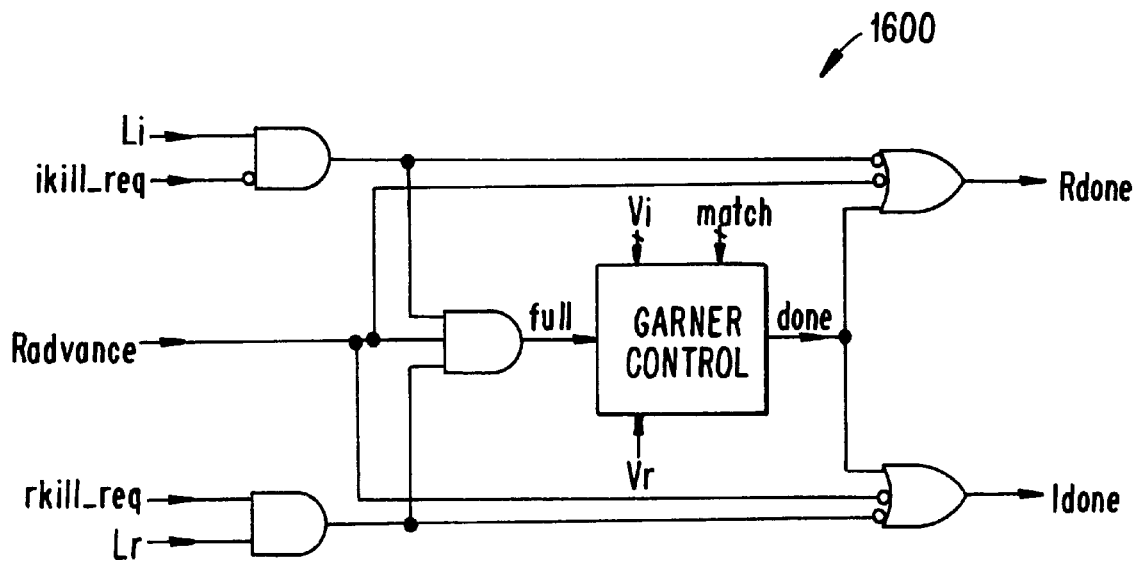
FIG. 16 is a modified full/empty box for use with a specific embodiment of the present invention.

As the counterflow pipeline of the present invention has been described, an inserted result would immediately trigger its own replacement due to a match between the new result name and the instruction destination register. In addition, an instruction or result which has been tagged to be killed could still trigger a garner/renrag cycle. To prevent these two cases, the full/empty box of FIG. 3(b) is further modified as shown by full/empty box 1600 of FIG. 16. Note that the same Radvance signal which forces an increased result dwell time in the stage also prevents the generating instruction from "seeing" it once it has been inserted. The exit of the instruction will set this flag and make the inserted result visible to any succeeding instructions.

While the invention has been particularly shown and described with reference to specific embodiments thereof, it will be understood by those skilled in the art that the foregoing and other changes in the form and details may be made therein without departing from the spirit or scope of the invention. The scope of the invention should therefore be determined by reference to the appended claims.

What is claimed is:

1. A counterflow pipeline for use in an asynchronous processor, comprising:

a first pipeline for transmitting instructions in a first direction, the first pipeline having a plurality of stages;

a second pipeline for transmitting results in a second direction opposite the first direction, the second pipeline having a plurality of stages, each of the second pipeline stages corresponding to a first pipeline stage and forming a counterflow pipeline stage therewith; and arbitration logic coupled between the first and second pipelines for facilitating movement of the instructions in the stages of the first pipeline and movement of the results in the stages of the second pipeline, in which instruction lines and results lines are connected to control adjacent counterflow pipeline stages using a four-phase level signaling protocol, the arbitration logic including:

an instruction line;
   a results line;
   an AND gate having input terminals coupled to each of the instruction line and the the results line and having an output terminal coupled to a delay element;
   a first OR gate having input terminals coupled to the instruction line and the delay element; and
   a second OR gate having input terminals coupled to the results line and the delay element, whereby the contemporaneous presence of both an instruction and a result is maintained in a particular counterflow pipeline stage until the instruction and the result can interact with each other, and instructions and results are prevented from being simultaneously released from adjacent counterflow pipeline stages.

2. The counterflow pipeline of claim 1 wherein the first pipeline stages each comprise a plurality of latches for receiving, storing and transmitting the instructions which include first data packets, each first data packet having a plurality of fields, and wherein the second pipeline stages each comprise a plurality of latches for receiving, storing and transmitting the results which include second data packets, each second data packet having a plurality of fields.

3. The counterflow pipeline of claim 2 wherein the first data packet fields comprise an opcode field, at least one source register field, at least one destination register field, at least one source value field corresponding to the at least one source register field, and at least one destination value field corresponding to the destination register field, and the second data packet fields comprise at least one result register field, and at least one result value field corresponding to the result register field.

4. The counterflow pipeline of claim 3 wherein each of the first and second data packet fields includes a validity bit.

5. The counterflow pipeline of claim 3 wherein each second data packet also includes a position field which indicates invalidity of corresponding instructions in the first pipeline.

6. The counterflow pipeline of claim 3 wherein selected first pipeline stages comprise an execution unit for executing an operation indicated by the opcode field.

7. The counterflow pipeline of claim 2 further comprising a plurality of comparing circuits coupled between the first pipeline and the second pipeline for comparing the first and second data packet fields in corresponding first and second pipeline stages.

8. The counterflow pipeline of claim 7 further comprising transmission circuits coupled between the first pipeline and the second pipeline for transmitting first and second data packet field data between corresponding first and second pipeline stages.

9. A counterflow pipeline as in claim 1 wherein the delay element is provided by the inherent delay of the arbitration logic.

10. In a counterflow pipeline comprising a first pipeline having a plurality of first pipeline stages, a second pipeline having a plurality of second pipeline stages, each of the second pipeline stages corresponding to a first pipeline stage and forming a counterflow pipeline stage therewith, and arbitration logic coupled between the first and second pipelines for facilitating movement of first data packets between the first pipeline stages and second data packets between the second pipeline stages, the arbitration logic including an AND gate having input terminals coupled to each of an instruction line and a result line and having an output terminal coupled to a delay element, a first OR gate having input terminals coupled to the instruction line and the delay element, a second OR gate having input terminals coupled to the results line and the delay element, the method comprising:

transmitting the first data packets in the first pipeline in a first direction;

transmitting the second data packets in the second pipeline in a second direction opposite the first direction; and inhibiting selected first and second data packets from being released simultaneously from adjacent counterflow pipeline stages using a four-phase level signalling protocol whereby one of the pipeline stages before transmitting data to a next pipeline stage sets one of the instruction line and the result line to a desired state enabling the contemporaneous presence of both an instruction and a result to be maintained in a particular counterflow pipeline stage until the instruction and the result can interact with each other, yet also preventing the instruction and the result from being simultaneously released from adjacent counterflow pipeline stages.

11. The method of claim 10 further comprising the steps of:

comparing a first field in a selected first data packet in a selected first pipeline stage with a second field in a selected second data packet in a selected second pipeline stage which is part of a first counterflow pipeline stage along with the selected first pipeline stage; and transmitting data from the selected first data packet to the selected second data packet in response to a condition indicated by the comparing step.

12. The method of claim 11 wherein the first field in the selected first data packet comprises a destination register field and the second field in the selected second data packet comprises a result register field, and wherein the condition comprises the result register field matching the source register field and an instruction represented by the first field is valid and has been executed.

13. The method of claim 10 further comprising the steps of:

comparing a first field in a selected first data packet in a selected first pipeline stage with a second field in a selected second data packet in a selected second pipeline stage which is part of a first counterflow pipeline stage along with the selected first pipeline stage; and transmitting data from the selected second data packet to the selected first data packet in response to a condition indicated by the comparing step.

14. The method of claim 13 wherein the first field in the selected first data packet comprises a source register field and the second field in the selected second data packet comprises a result register field, the selected second data packet also comprising a result value field, and wherein the condition comprises the result register field matching the source register field and the result value field being valid.

15. The method of claim 10 further comprising the steps of:

comparing a first field in a selected first data packet in a selected first pipeline stage with a second field in a selected second data packet in a selected second pipeline stage which is part of a first counterflow pipeline stage along with the selected first pipeline stage; and removing the selected first data packet from the first pipeline in response to a condition indicated by the comparing step.

16. The method of claim 15 wherein the condition comprises the selected first data packet being invalid.

17. The method of claim 10 further comprising the steps of:

comparing a first field in a selected first data packet in a selected first pipeline stage with a second field in a selected second data packet in a selected second pipeline stage which is part of a first counterflow pipeline stage along with the selected first pipeline stage; and removing the selected second data packet from the second pipeline in response to a condition indicated by the comparing step.

18. The method of claim 17 wherein the condition comprises the selected second data packet being invalid.

* * * * *